(12) United States Patent
Walter et al.

(10) Patent No.: US 6,572,805 B1
(45) Date of Patent: Jun. 3, 2003

(54) METHOD FOR PRODUCING A COLOR-DECORATED INJECTION MOLDING

(75) Inventors: Thomas Walter, Oldenberg (DE); Maximilian Zaher, Oldenberg (DE)

(73) Assignee: Bush Industries, Inc., Jamestown, NY (US)

( * ) Notice: Subject to any disclaimer, the term of this patent is extended or adjusted under 35 U.S.C. 154(b) by 0 days.

(21) Appl. No.: 09/417,389

(22) Filed: Oct. 13, 1999

(30) Foreign Application Priority Data

Oct. 13, 1998 (EP) .............................. 98119332

(51) Int. Cl.[7] .............................. B29C 45/16
(52) U.S. Cl. .................. 264/135; 264/234; 264/246; 264/247
(58) Field of Search ................ 264/247, 246, 264/245, 135, 132, 134, 78, 235, 234

(56) References Cited

U.S. PATENT DOCUMENTS

| | | | |
|---|---|---|---|
| 2,811,744 A | | 11/1957 | Baldanza ..................... 18/5.3 |
| 3,968,309 A | * | 7/1976 | Matsuo et al. |
| 4,360,329 A | * | 11/1982 | Hatakeyama |
| 4,587,155 A | * | 5/1986 | Durand |
| 4,898,706 A | * | 2/1990 | Yabe et al. |
| 4,931,248 A | | 6/1990 | Willemin .................... 264/266 |
| 5,707,581 A | * | 1/1998 | Yamazaki |
| 5,925,302 A | * | 7/1999 | Oono et al. |

FOREIGN PATENT DOCUMENTS

| | | |
|---|---|---|
| EP | 0296108 | 12/1988 |
| EP | 0573676 | 12/1993 |
| FR | 2728194 | 6/1996 |
| JP | 63078718 | 8/1988 |
| WO | 9516555 | 6/1995 |
| WO | 9815416 | 4/1998 |

OTHER PUBLICATIONS

European Search Report for foreign counterpart Application Publication No. EP 98 11 9332 Dated Mar. 11, 1999.
US 4,931,248 is English Language Equivalent to EP 0 296 108 English language Abstract provided with copy of French patent. English Language Abstract Only provided.

* cited by examiner

Primary Examiner—Mark Eashoo
Assistant Examiner—Geoffrey P. Shipsides
(74) Attorney, Agent, or Firm—Webb Ziesenheim Logsdon Orkin & Hanson, P.C.

(57) ABSTRACT

A method is disclosed for producing a color-decorated injection molding. The method involves the steps of transferring a colored decoration having colored molecules to a plastics film, supporting the coated plastics film in an injection molding apparatus, back spraying the apparatus with plastic and increasing the temperature of the plastic to diffuse the colored molecules into the plastic.

9 Claims, 1 Drawing Sheet

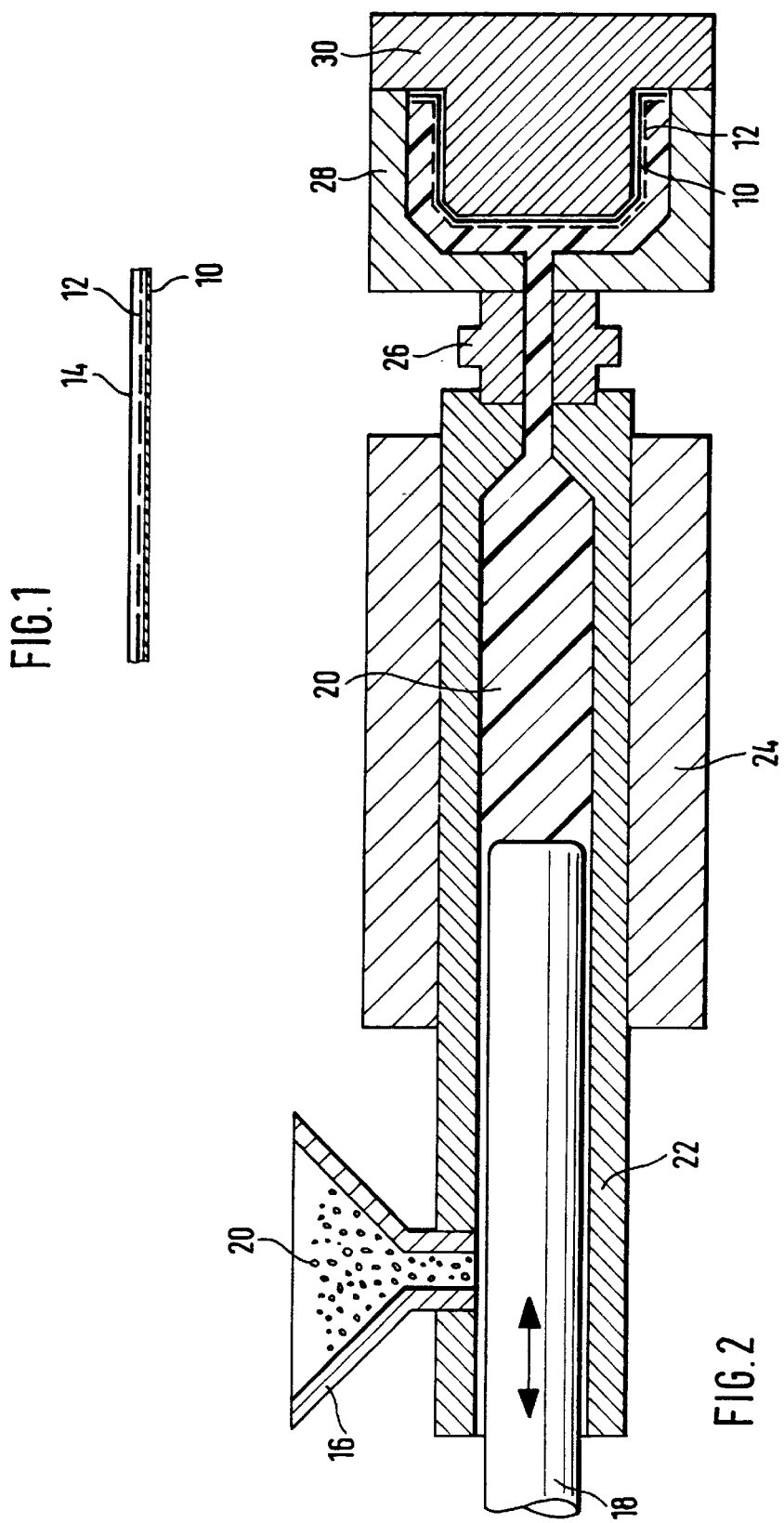

METHOD FOR PRODUCING A COLOR-DECORATED INJECTION MOLDING

BACKGROUND OF THE INVENTION

1. Field of the Invention

The invention relates to a method of producing a color-decorated injection molding.

2. Description of the Related Art

Injection molding technology is used for the large scale processing of thermoplastic molding compounds. Thermoplastics soften on heating and can be deformed in the plastic state. When a plunger injection molding machine is employed, the thermoplastic material is heated, preplastified by the plunger, and then pressed through channels or dies into a cooled mold. In the case of screw injection molding machines, the screw acts like a plunger and fills the mold so the material is plastified uniformly by the screw and a highly homogeneous temperature distribution is obtained.

An object of the invention is to provide a method by which color-decorated injection moldings having high physical and chemical quality and having good aesthetic effect can be produced. The colored decoration should, in particular, be of high strength and should give a high-grade visual impression.

European Patent Application No. EP 0 573 676 A1 describes the use of a support having a release characteristic for applying colored decoration to a substrate. In this prior art document, the colored decoration is first applied to a support having a release characteristic. A coating material is then applied over the colored decoration. The coating material is subsequently subjected to partial cross linking, and then, under pressure and/or elevated temperature, the partially cross linked coating material together with the colored decoration is transferred from the support to the substrate which is ultimately to be decorated. This transfer takes place in such a way that the coating material lies on the substrate under the colored decoration. Finally, further cross linking of the coating material takes place on the substrate.

U.S. patent application Ser. No. 08/946,802 filed Oct. 8, 1997 entitled "Method and Apparatus for Applying a Decoration to an Article"; U.S. Pat. No. 5,908,525 issued Jun. 1, 1999 and entitled "Method and Apparatus for Applying a Decoration to an Article" and U.S. Pat. No. 5,916,400 issued Jun. 29, 1999 and entitled "Method and Apparatus for Manipulating and Article for Applying a Decoration Thereon" are hereby incorporated by reference.

BRIEF SUMMARY OF THE INVENTION

The invention achieves the above-mentioned object by the following steps:

a) coating a plastics film with a colored decoration having dye molecules, b) supporting the coated plastics film in an injection molding apparatus, c) back spraying the plastics film with plastic in the injection molding apparatus, and d) increasing the temperature to promote diffusion of dye molecules into the plastic.

The method of the subject invention can be used to produce large quantities of injection moldings in a cost effective operation to produce high quality parts. Examples of such moldings include, among others, automotive parts, housings for electronic appliances, sheets, and elements for the construction industry.

Particularly suitable materials for the plastics film upon which a colored decoration may be deposited are thermoplastics, especially polycarbonate and, polymethyl methacrylate (PMMA). It is also possible to use a plastics film made from polyolefins or copolymeric polyolefins and mixtures thereof. A preferred plastics film material is ethylene-styrene interpolymer, which is also identified by the name ESI and manufactured by the DOW Chemical Company. This film is a copolymeric polyolefin.

The thickness of the plastics film may be from 0.0002 to 0.002 inches (50 to 500 $\mu$m).

To improve the quality of the colored decoration, the colored decoration may be transferred from a support onto the plastics film. The support has release characteristics which promote removal of the decoration from the support.

Supports having release characteristics are known and are illustrated in European Patent Application No. EP 0 573 676 A1. Particularly suitable sheetlike supports having release characteristics are certain papers or plastics films whose surface is designed or has been treated so that color layers or coating films applied under defined conditions can be transferred to an article or film by a kind of "peeling" process which is similar to the process for peeling a decal. For the present invention, particularly suitable supports having such release characteristics are plastics films and especially polyester films. To promote peeling, the prior art has also disclosed appropriate release coats for a film having a release characteristic.

The diffusion of the dye molecules of the colored decoration takes place preferably at elevated temperatures from 356 to 572° F. (180 to 300° C.) and depends on the properties of the plastics used. This color diffusion takes place both into the plastics film and into the back sprayed plastic. The color diffusion generates a depth effect of the resulting colored decoration of the injection molding, since the dye molecules diffuse different distances in the plastic depending on their molecular weight. The result is an aesthetically appealing, high-quality decoration.

The increase in temperature can be carried out at least in part during the back spraying operation, or thereafter.

In a preferred embodiment a coating film is applied to the colored decoration after the colored decoration has been applied to the plastics film. The coating film is preferably also colored to provide a base color for the injection molded part. Within the injection molding apparatus, the coating film lies above the colored decoration. Below the colored decoration lies the plastics film such that the coating film directly faces the injection molding material. The coating film imparts a base color to the injection molding material. Superimposed on this base color is the colored decoration having dye molecules which diffuse a greater or lesser distance into the overlying plastics film.

BRIEF DESCRIPTION OF THE DRAWINGS

In the text below an exemplary embodiment of the invention is described in more detail with reference to the drawing, in which:

FIG. 1 illustrates a schematic of a plastics film with an applied color decoration and an overlying coating film; and FIG. 2 illustrates a schematic of an injection molding apparatus with the plastics film in accordance with FIG. 1 supported therein.

DETAILED DESCRIPTION OF THE INVENTION

In the embodiment depicted in FIG. 1 a plastics film 10 consists of polymethyl methacrylate (PMMA). The plastics film 10 may have a thickness between 0.0002 to 0.002 inches (50 to 500 μm). A colored decoration 12 having diffusible dye molecules is applied to the plastics film 10. Application of the colored decoration 12 to the plastics film 10 may take place using the technique discussed in European Patent Application No. EP 0 573 676, wherein the colored decoration 12 is first of all printed onto a support such as a polyester film (not shown). The polyester film has good release characteristics. In accordance with the present invention, the colored decoration 12 is then transferred by, for example, peeling from the support film to the plastics film 10 in accordance with FIG. 1.

Subsequently, a coating film 14 is applied over the colored decoration 12.

The plastics film 10, with the colored decoration 12 and with the coating film 14, is then clamped into an injection molding apparatus in accordance with FIG. 2. FIG. 2 shows only the plastics film 10 and the colored decoration 12. For simplicity, the coating film 14 has been omitted from the drawing in FIG. 2 although it is actually present.

The injection molding apparatus has a feed hopper 16 into which thermoplastic material 20 is introduced in a manner which is known by those skilled in the art of injection molding. The injection molding apparatus has a plunger 18 which can be moved in the direction of the arrow. The injection molding material 20 is conveyed within a channel 22, in a direction from left to right based on the illustration in FIG. 2. At the same time the material is held at the injection molding temperature by means of a heating system 24. The injection molding compound 20 is injected through an outer die ring 26 into molds 28, 30. This injection molding technique is also known by those skilled in the art of injection molding.

The plastics film 10 is supported in the molds 28, 30 along with the decoration 12 and the overlying coating film 14. The injection molding compound 20 is back sprayed behind the film 10 and so produces the color-decorated injection molding. In the embodiment depicted, the injection molded piece has the form of a shell in which only the shell internal surface is covered by the colored decoration 12. The method described is also suitable for producing injection moldings which, if desired, can be color-decorated over their entire area in the manner described herein for a particular surface.

During or after the injection molding operation, an increase in temperature takes place in order to bring about diffusion of the dye molecules of the colored decoration 12 into the plastics film 10 to achieve the above-discussed depth effect of the colored decoration. As mentioned the diffusion of the dye molecules of the colored decoration takes place preferably at elevated temperatures from 356 to 572° F. (180 to 300° C.) and depends on the properties of the plastics used.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. Method of producing a color-decorated injection molding, comprising the steps of:
    a) coating a plastics film with a colored decoration having dye molecules;
    b) applying a coating material to the colored decoration;
    c) supporting the coated plastics film in an injection molding apparatus;
    d) back spraying the coating material of the plastics film with plastic in the injection molding apparatus to produce plastic coated with the coating material;
    e) heating the plastics film to promote diffusion of dye molecules from the plastics film into the plastic; and
    f) wherein the step of heating the plastics film occurs no earlier than simultaneously with the step of back spraying the plastics film.

2. The method according to claim 1 wherein the plastics film is thermoplastic.

3. The method according to claim 1 wherein the plastics film is polycarbonate.

4. The method according to claim 1 wherein the plastics film is at least as a constituent, polymethyl methacrylate (PMMA).

5. The method according to claim 1 wherein coating a plastics film takes place by transfer of the colored decoration from a film having release characteristics.

6. The method according to claim 1 wherein the step of heating the plastics film involves increasing the temperature to between 356 to 572° F.

7. The method according to claim 1 wherein the step of heating the plastics film takes place simultaneously with the step of back spraying.

8. The method according to claim 1 wherein the plastics film has a thickness between 0.0002 to 0.002 inches.

9. The method according to claim 1 wherein the step of heating the plastics film takes place after the step of back spraying.

* * * * *

UNITED STATES PATENT AND TRADEMARK OFFICE
CERTIFICATE OF CORRECTION

PATENT NO. : 6,572,805 B1
DATED : June 3, 2003
INVENTOR(S) : Thomas Walter et al.

It is certified that error appears in the above-identified patent and that said Letters Patent is hereby corrected as shown below:

Title page,
Item [56], References Cited, FOREIGN PATENT DOCUMENTS, insert:

-- 61242825    10/1986    Japan
   62080025    4/1987     Japan
   60192617    3/1984     Japan
   54108704    8/1979     Japan --.

Signed and Sealed this

Twenty-first Day of October, 2003

JAMES E. ROGAN
*Director of the United States Patent and Trademark Office*